US011942283B2

(12) United States Patent
Baumann et al.

(10) Patent No.: US 11,942,283 B2
(45) Date of Patent: Mar. 26, 2024

(54) FIXING MODULE FOR A CONTROL AND SIGNALING DEVICE HAVING AN INTEGRATED GROUNDING FUNCTION

(71) Applicant: Siemens Aktiengesellschaft, Munich (DE)

(72) Inventors: Christian Baumann, Fensterbach (DE); Jean Jacques Faurie, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 146 days.

(21) Appl. No.: 16/935,310

(22) Filed: Jul. 22, 2020

(65) Prior Publication Data

US 2021/0035751 A1 Feb. 4, 2021

(30) Foreign Application Priority Data

Jul. 31, 2019 (EP) .................................... 19189262

(51) Int. Cl.
*H01H 13/04* (2006.01)
*H01H 13/50* (2006.01)

(52) U.S. Cl.
CPC ............ *H01H 13/04* (2013.01); *H01H 13/50* (2013.01)

(58) Field of Classification Search
CPC ........ H01H 13/04; H01H 13/50; H01H 3/125; H01H 13/705; H01H 13/14; H01H 13/70; H01H 13/704; H01H 13/7065; H01H 13/7006; H01H 13/7057; H01H 13/78; H01H 13/79; H01H 13/52; H01H 13/703
See application file for complete search history.

(56) References Cited

U.S. PATENT DOCUMENTS 4,794,215 A * 12/1988 Sawada .................. H01H 13/06 200/305
4,876,461 A * 10/1989 Gratke ................. H03K 17/967 307/116
8,969,740 B2 3/2015 Bardy et al.
(Continued)

FOREIGN PATENT DOCUMENTS

CN 101599376 A 12/2009
CN 201732709 U 2/2011
CN 102237214 A 11/2011
(Continued)

OTHER PUBLICATIONS

Extended European Search Report dated Jan. 21, 2020.
Office Action for Chinese Patent Application No. 202010735919.0 dated Feb. 2, 2023.

*Primary Examiner* — Ahmed M Saeed
(74) *Attorney, Agent, or Firm* — Harness, Dickey & Pierce, P.L.C.

(57) ABSTRACT

A fixing module is for fixing a push button or emergency stop button or rotary actuator of a control and signaling device. In an embodiment, the fixing module is constructed from a top housing part and a bottom housing part, each including a cuboidal structure with a top side, an underside and four side parts connecting the top side to the underside. In at least one embodiment, on the top side of the bottom housing part, a material that extends at least partially in this plane and has a grounding function is formed or an electrically conductive component made of metal with a grounding function is arranged.

20 Claims, 3 Drawing Sheets

(56) References Cited

U.S. PATENT DOCUMENTS

| | | | |
|---|---|---|---|
| 2009/0301848 | A1 | 12/2009 | Huang |

FOREIGN PATENT DOCUMENTS

| | | | | | |
|---|---|---|---|---|---|
| CN | 103578822 | | * | 2/2014 | ............. H01H 13/10 |
| DE | 9109678 | U1 | | 12/1992 | |
| DE | 202012008253 | U1 | | 12/2013 | |
| EP | 2704273 | A1 | | 3/2014 | |
| EP | 2852014 | A1 | | 3/2015 | |
| FR | 2974681 | A1 | | 11/2012 | |
| KR | 20090118302 | | * | 11/2009 | ........... H01H 13/704 |
| WO | WO-2019056316 | A1 | * | 3/2019 | ............. H01H 13/04 |

* cited by examiner

FIXING MODULE FOR A CONTROL AND SIGNALING DEVICE HAVING AN INTEGRATED GROUNDING FUNCTION

PRIORITY STATEMENT

The present application hereby claims priority under 35 U.S.C. § 119 to European patent application number EP 19189262.9 filed Jul. 31, 2019, the entire contents of which are hereby incorporated herein by reference.

FIELD

Embodiments of the invention generally relate to a fixing module for fixing a push button or emergency stop button or rotary actuator of a control and signaling device, and more specifically one wherein the fixing module is constructed from a top housing part and a bottom housing part, which each have a cuboidal structure with a top side, an underside and four side parts connecting the top side to the underside.

BACKGROUND

A fixing module of this kind is used in machines or electrical systems that are operated via control devices such as, for example, push buttons, selector switches, etc., which act on the controller. These control devices are mounted in control panels, operator panels, switch cabinet doors or housing covers. Control devices are generally of modular construction, meaning that they include a push button, a fixing module such as, for example, a ring nut or a mounting holder and a plurality of switch elements, which are embodied as break-contact or make-contact switching elements. For mounting, the push button is generally guided from the front through a hole in the control panel and mounted from the rear via a fixing module. The switch elements are mounted mechanically on the fixing module by screws, snap-fits or catches. The electrical connection of the switch elements to the controller is effected via connecting terminals.

The housing of the fixing modules for control and signaling devices is sometimes manufactured from a metal material, for example a zinc die-casting, in order to achieve advantages in terms of mechanical robustness and visual appearance. On account of the electrical conductivity of the housing, measures have to be taken to ensure the requisite isolating distances and air gaps.

SUMMARY

The inventors have discovered that a drawback of the housing variant manufactured from metal is that, although this solution is very robust, it is also very expensive on account of the choice of material.

Accordingly, at least one embodiment of the present invention creates a fixing module for control and signaling devices that is cost-effective to produce and ensures reliable grounding.

Embodiments of the invention are directed to a fixing module; a push button or emergency stop button or rotary actuator having a fixing module; and a control and signaling device. Advantageous configurations and developments, which can be used individually or in combination with one another, are the subject matter of the claims.

At least one embodiment of the invention is directed to a fixing module for fixing a push button or emergency stop button or rotary actuator of a control and signaling device, wherein the fixing module is constructed from a top housing part and a bottom housing part, which each have a cuboidal structure with a top side, an underside and four side parts connecting the top side to the underside. The invention is characterized in that, on the top side of the bottom housing part, a material that extends at least partially in this plane and has a grounding function is formed.

At least one embodiment is furthermore directed to a push button or emergency stop button or rotary actuator having one of the two fixing modules.

At least one embodiment is also directed to a control and signaling device having a push button or emergency stop button or rotary actuator and at least one switch element, wherein the push button or emergency stop button or rotary actuator and the at least one switch element are mounted on one of the two fixing modules.

At least one embodiment is also directed to a fixing module for fixing a push button or emergency stop button or rotary actuator of a control and signaling device, wherein the fixing module is constructed from a top housing part and a bottom housing part, each of the top housing part and the bottom housing part including:

- a cuboidal structure including a top side, an underside and four side parts connecting the top side to the underside, wherein, on the top side of the bottom housing part, a material extending at least partially in a plane and including a grounding function is formed.

At least one embodiment is also directed to a fixing module for fixing a push button or emergency stop button or rotary actuator of a control and signaling device, the fixing module being constructed from a top housing part and a bottom housing part, each of the top housing part and the bottom housing part including:

- a cuboidal structure including a top side, an underside and four side parts connecting the top side to the underside, wherein, on the top side of the bottom housing part, an electrically conductive component made of metal with a grounding function is arranged.

BRIEF DESCRIPTION OF THE DRAWINGS

Further embodiments and advantages of the invention are explained in the following text on the basis of example embodiments and on the basis of the drawing.

In the drawing.

DETAILED DESCRIPTION OF THE EXAMPLE EMBODIMENTS

Figure 1:
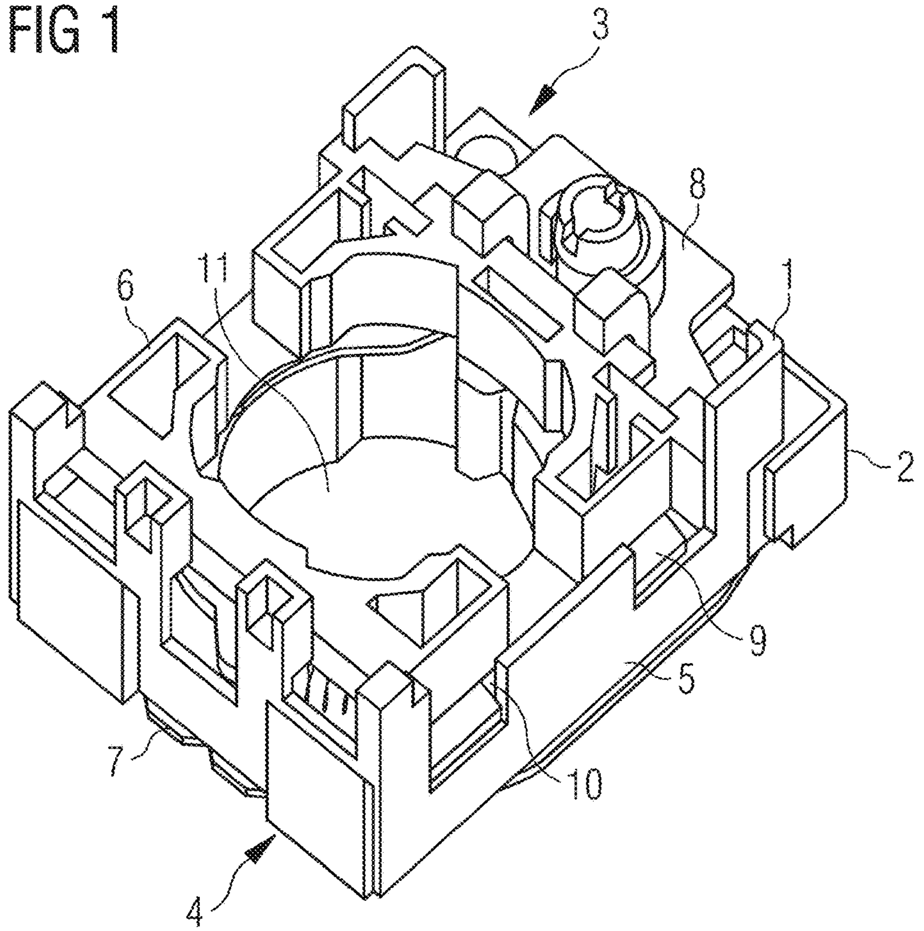
FIG. 1 shows a perspective illustration of a fixing module according to an embodiment of the invention, having a top housing part and a bottom housing part.

The above and other elements, features, steps, and concepts of the present disclosure will be more apparent from the following detailed description in accordance with example embodiments of the invention, which will be explained with reference to the accompanying drawings.

It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection, or communication, or coupling between functional blocks, devices, components, or other physical or functional units shown in the drawings or described herein may also be implemented by an indirect connection or coupling.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as “processing” or “computing” or “calculating” or “determining” of “displaying” or the like, refer to the action and processes of a computer system, or similar electronic computing device/hardware, that manipulates and transforms data represented as physical, electronic quantities within the computer system’s registers and memories into other data similarly represented as physical quantities within the computer system memories or registers or other such information storage, transmission or display devices.

In this application, including the definitions below, the term ‘module’ or the term ‘controller’ may be replaced with the term ‘circuit.’ The term ‘module’ may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment of the invention is directed to a fixing module for fixing a push button or emergency stop button or rotary actuator of a control and signaling device, wherein the fixing module is constructed from a top housing part and a bottom housing part, which each have a cuboidal structure with a top side, an underside and four side parts connecting the top side to the underside. The invention is characterized in that, on the top side of the bottom housing part, a material that extends at least partially in this plane and has a grounding function is formed.

An advantageous embodiment of the concept, according to the invention, of a fixing module can reside in that the material that extends at least partially in the plane and has a grounding function is a grounding foil.

A continuation of the concept, according to an embodiment of the invention, for the fixing module can reside in that the material that extends in the plane of the top side of the bottom housing part has a plurality of layers.

A development of a specific configuration of the concept, according to an embodiment of the invention, for the fixing module can provide for the material that extends in the plane of the top side of the bottom housing part to be arranged on the top side of the bottom housing part in a positionally stable manner via an adhesive layer.

In a specific embodiment of the concept, according to an embodiment of the invention, for the fixing module, the material that extends in the plane of the top side of the bottom housing part has a polymer-containing layer.

A continuation of the concept, according to an embodiment of the invention, for the fixing module can reside in that the material that extends in the plane of the top side of the bottom housing part has a graphite layer.

A development of a specific configuration of the concept, according to an embodiment of the invention, for the fixing module can provide for the material that extends in the plane of the top side of the bottom housing part to be configured such that grounding of the electric currents that flow through metal components in the housing of the fixing module is formed via at least one contact point.

In a specific embodiment of the concept, according to an embodiment of the invention, for the fixing module, the housing parts of the fixing module are both manufactured from metal or one housing part is manufactured from plastic and the other is manufactured from metal.

A further example embodiment of the fixing module resides in that, on the top side of the bottom housing part, an electrically conductive component made of metal with a grounding function is arranged.

In a specific embodiment of the concept, according to an embodiment of the invention, for this fixing module, the electrically conductive component is a spring element.

At least one embodiment is furthermore directed to a push button or emergency stop button or rotary actuator having one of the two fixing modules.

At least one embodiment is also directed to a control and signaling device having a push button or emergency stop button or rotary actuator and at least one switch element, wherein the push button or emergency stop button or rotary actuator and the at least one switch element are mounted on one of the two fixing modules.

The fixing module according to at least one embodiment is the invention preferably has a two-part housing made up of a top housing part and a bottom housing part. The housing parts are each configured in a cuboidal manner with a top side, an underside and four side parts connecting the top side to the underside. The housing parts can be fastened together preferably via clamping lugs, wherein the top housing part has recesses for receiving the clamping lugs on the bottom housing part. This arrangement for the clamped connection for fixing the housing parts together can also be the other way around. A concentric passage opening is arranged preferably in a centered manner in an identical position in both housing parts.

The fixing module for the push button has a snap ring, which rests on the top side of the bottom housing part and surrounds the passage opening. An actuating lever is arranged, preferably in one piece, on the snap ring, the actuating lever releasing the push button when actuated. Beneath the snap ring, a gearwheel is arranged in the bottom housing part, the gearwheel being operatively connected to a pinion. Fastened to the snap ring is a restoring spring, which allows restoration into the starting position. Positioned in the pinion, from the underside of the bottom housing part, is a contact pin, into which a peg has been inserted as a rotation lock.

The grounding function of the fixing module can be implemented either via a spring element, which is fastened between the pinion and a connection dome on the top side of the bottom housing part, or via a grounding foil. The grounding foil has preferably at least one contact point in the form of a tab with the pinion. The grounding foil is positioned between the top side of the bottom housing part and the snap ring. The grounding foil has cutouts for possible connection domes.

FIG. 1 shows a fixing module according to an embodiment of the invention having a top housing part 1 and a bottom housing part 2. The fixing module according to an embodiment of the invention has preferably a two-part housing made up of a top housing part 1 and a bottom housing part 2. The housing parts are each formed in a cuboidal manner with a top side 3, an underside 4 and four side parts 5, 6, 7, 8 connecting the top side 3 to the underside 4. The housing parts can be fastened together preferably via clamping lugs 9, wherein the top housing part 1 has recesses 10 for receiving the clamping lugs 9 on the bottom housing part 2. This arrangement for the clamping connection for fixing the housing parts together can also be the other way around. A concentric passage opening 11 is arranged preferably in a centered manner in an identical position, one on top of the other, in both housing parts.

Figure 2:
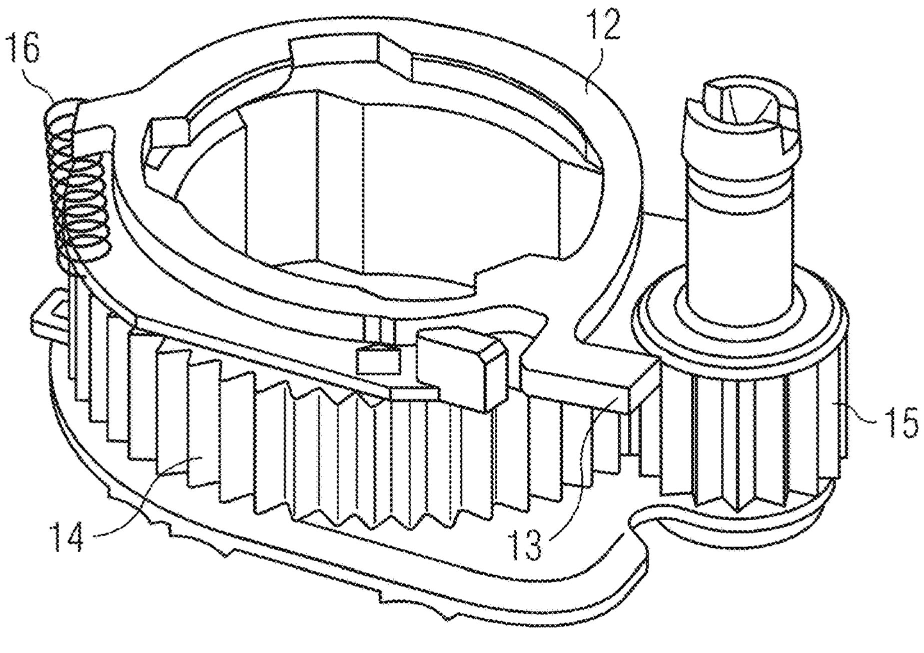
FIG. 2 shows a perspective illustration of a holding device in a fixing module according to an embodiment of the invention for a control and signaling device.

FIG. 2 illustrates a holding device in a fixing module according to an embodiment of the invention for a control and signaling device. The holding device for the push button has a snap ring 12, which rests on the top side 3 of the bottom housing part 2 and surrounds the passage opening 11. An actuating lever 13 is arranged, preferably in one piece, on the snap ring 12, the actuating lever 13 releasing the push button when actuated. Beneath the snap ring 12, a gearwheel 14 is arranged in the bottom housing part 2, the gearwheel 14 being operatively connected to a pinion 15. Fastened to the snap ring 12 is a restoring spring 16, which allows restoration into the starting position.

Figure 3:
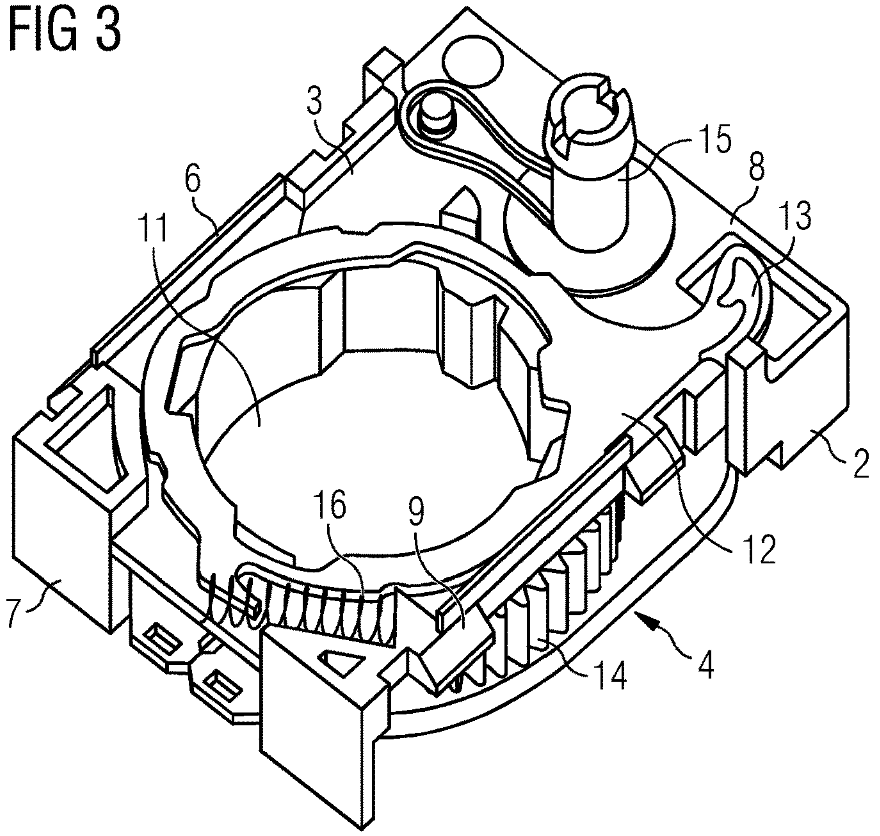
FIG. 3 shows a perspective illustration of the bottom housing part according to FIG. 1 with a first example embodiment of a grounding function in the form of a spring element.

FIG. 3 shows the bottom housing part 2 according to FIG. 1 with a first example embodiment of a grounding function in the form of a spring element 19. The spring element 19 is tensioned between a connection dome 16 and the pinion 15 on the top side 3 of the bottom housing part 2.

Figure 4:
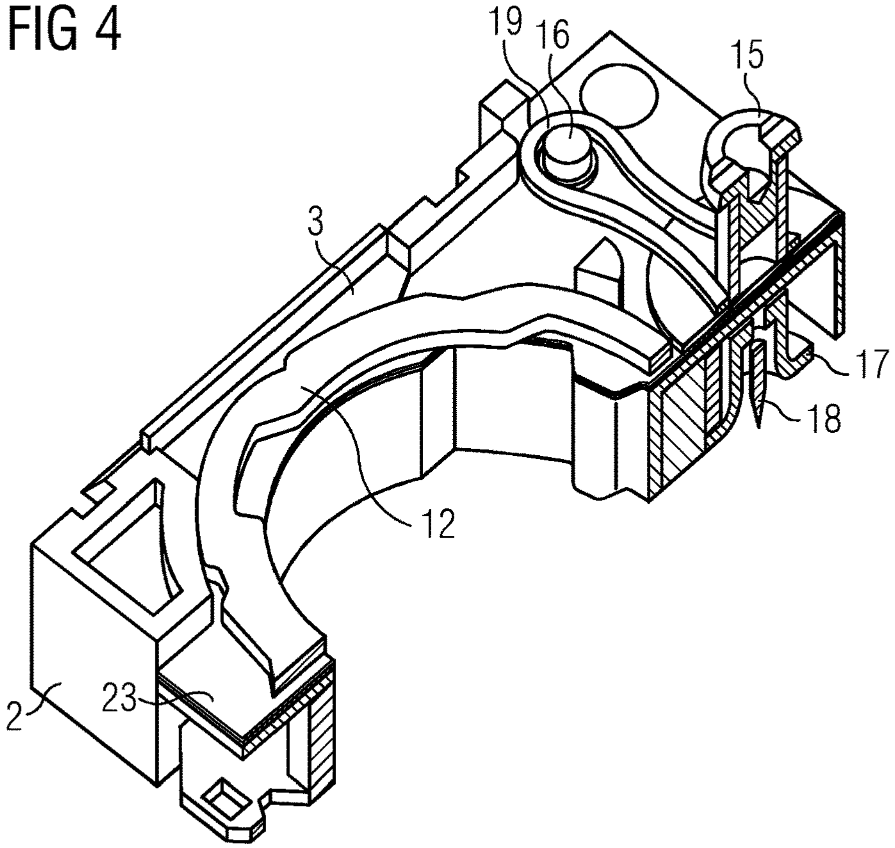
FIG. 4 shows a perspective sectional illustration of an enlarged detail from FIG. 3.

FIG. 4 illustrates an enlarged detail according to FIG. 3. It is apparent from this illustration that a contact pin 17, formed in a U-shaped manner, is arranged in the pinion 15, with an introduced peg 18, which serves as a rotation lock for the fixing module. The grounding function of the fixing module is implemented via the spring element 19, which is fastened between the pinion 15 and connection dome 16 to the top side 3 of the bottom housing part 2. A material extending in a plane of the top side 3 of the bottom housing part 2 includes a plurality of layers 23.

Figure 5:
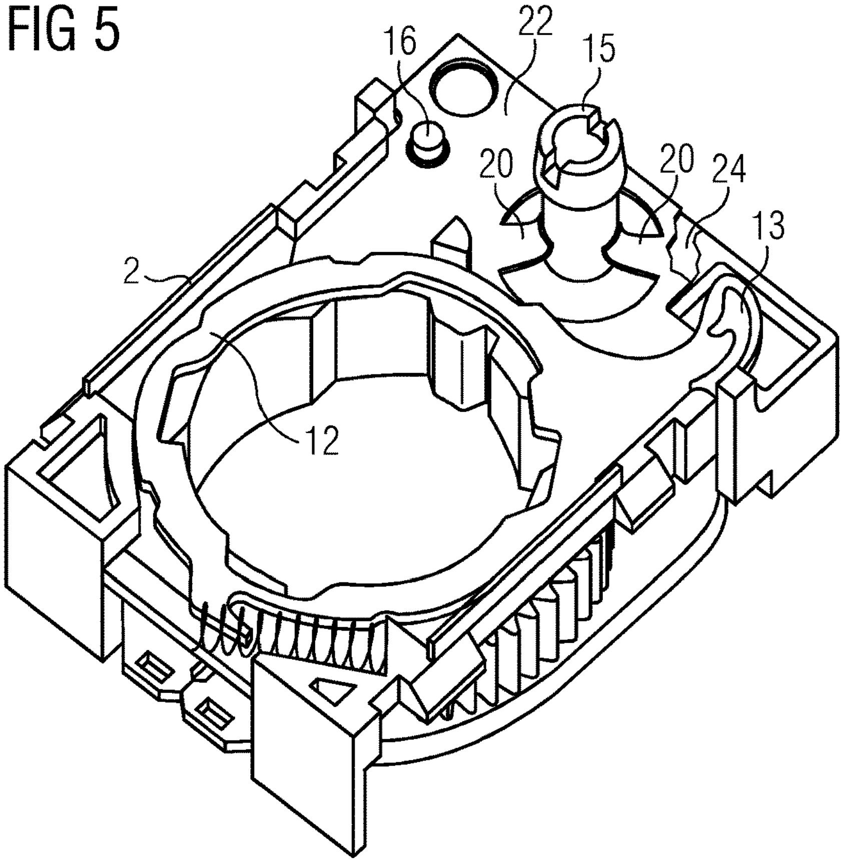
FIG. 5 shows a perspective illustration of a fixing module according to the invention having a second example embodiment of the grounding function in the form of an extending material, for example a grounding foil.

FIG. 5 illustrates a fixing module according to an embodiment of the invention having a second example embodiment for the grounding function in the form of a material with a foil-like appearance, for example a grounding foil 22. Formed on the top side 3 of the bottom housing part 2 is a material, extending at least partially in this plane, with a grounding function. The material has preferably at least one contact point 20 in the form of a tab with the pinion 15. The material, or the grounding foil 22, is positioned between the top side 3 of the bottom housing part 2 and the snap ring 12. The material, or the grounding foil 22, has cutouts 21 for possible connection domes 16. The material is arranged on the top side 3 of the bottom housing part 2 in a positionally stable manner on an adhesive layer 24.

Figure 6:
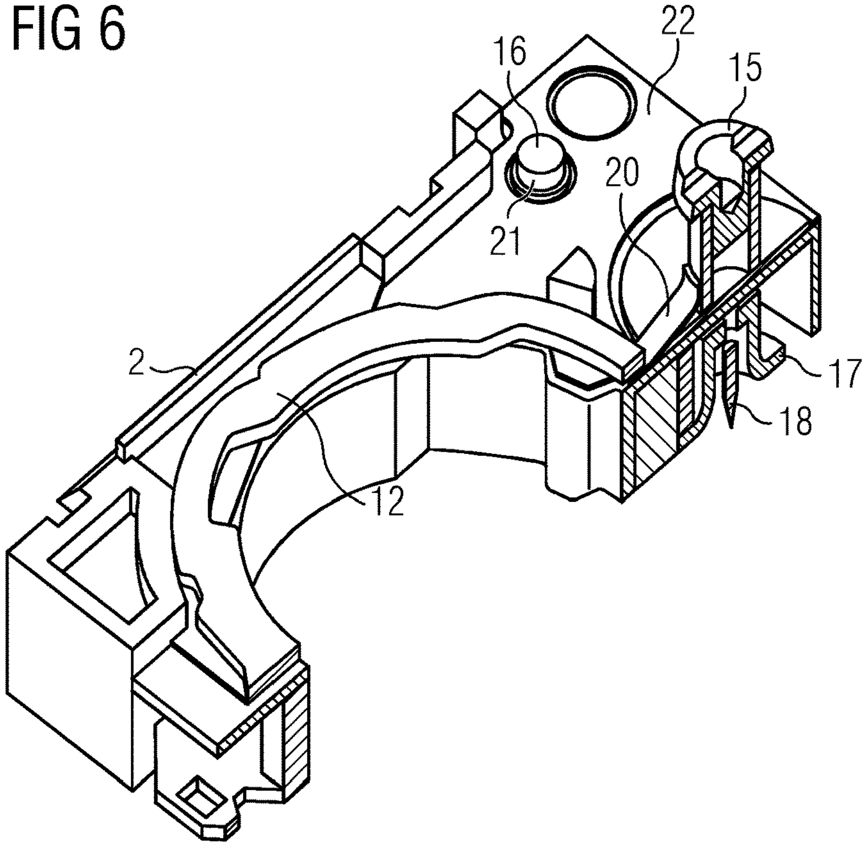
FIG. 6 shows a perspective sectional illustration of an enlarged detail from FIG. 5.

FIG. 6 illustrates an enlarged detail according to FIG. 5. In this second example embodiment, too, a contact pin 17, formed in a U-shaped manner, is arranged in the pinion 15 with an introduced peg 18 as a rotation lock for the fixing module.

The fixing module according to an embodiment of the invention is characterized in that the housing parts manufactured from metal retain simple grounding via a spring element or by the grounding foil. A housing combination with one housing part manufactured from metal and one from plastic represents a cost saving and can likewise be grounded in a simple manner via the grounding foil.

Although the invention has been illustrated in greater detail using the example embodiments, the invention is not limited by the disclosed examples, and a person skilled in the art can derive other variations therefrom without departing from the scope of protection of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase “means for” or, in the case of a method claim, using the phrases “operation for” or “step for.”

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCE SIGNS

1 Top housing part
2 Bottom housing part
3 Top side
4 Underside
5 Side part
6 Side part
7 Side part
8 Side part
9 Clamping lug
10 Recess
11 Passage opening
12 Snap ring
13 Actuating lever
14 Gearwheel
15 Pinion
16 Restoring spring
17 Contact pin
18 Peg
19 Spring element
20 Contact point
21 Cutout
22 Grounding foil

What is claimed is:

1. A fixing module for fixing a push button or emergency stop button or rotary actuator of a control and signaling device, wherein the fixing module is constructed from a top housing part and a bottom housing part, each of the top housing part and the bottom housing part including:

a cuboidal structure including a top side, an underside and four side parts connecting the top side to the underside;
a snap ring on the top side of the bottom housing part; and
a concentric passage opening in the top side of both the top housing part and the bottom housing part, wherein a material extending at least partially in a plane and including a grounding function is in surface contact with the top side of the bottom housing part, wherein the material is sandwiched between the top housing part and the bottom housing part.

2. The fixing module of claim 1, wherein the material extending at least partially in the plane and including a grounding function is a grounding foil.

3. The fixing module of claim 1, wherein the material extending in the plane of the top side of the bottom housing part includes a plurality of layers.

4. The fixing module of claim 3, further comprising an adhesive layer, wherein the material extending in the plane of the top side of the bottom housing part is arranged on the top side of the bottom housing part in a positionally stable manner on the adhesive layer.

5. The fixing module of claim 3, wherein the material extending in the plane of the top side of the bottom housing part includes a polymer-containing layer.

6. The fixing module of claim 3, wherein the material extending in in the plane of the top side of the bottom housing part includes a graphite layer.

7. The fixing module of claim 1, wherein the material extending in the plane of the top side of the bottom housing part is configured such that grounding of electric currents that flow through metal components in the fixing module is formed via at least one contact point.

8. The fixing module of claim 1, wherein the housing parts of the fixing module are both manufactured from metal or one housing part, of the housing parts, is manufactured from plastic and another housing part, of the housing parts, is manufactured from metal.

9. A push button or emergency stop button or rotary actuator comprising the fixing module of claim 1.

10. A control and signaling device having a push button or emergency stop button or rotary actuator and at least one switch element, wherein the push button or emergency stop button or rotary actuator and the at least one switch element are mounted on the fixing module of claim 1.

11. The fixing module of claim 2, wherein the material extending in the plane of the top side of the bottom housing part includes a plurality of layers.

12. The fixing module of claim 11, further comprising an adhesive layer, wherein the material extending in the plane of the top side of the bottom housing part is arranged on the top side of the bottom housing part in a positionally stable manner on the adhesive layer.

13. The fixing module of claim 12, wherein the material extending in the plane of the top side of the bottom housing part includes a polymer-containing layer.

14. The fixing module of claim 12, wherein the material extending in in the plane of the top side of the bottom housing part includes a graphite layer.

15. The fixing module of claim 1, further comprising a holding device for a push button including the snap ring on the top side of the bottom housing part that surrounds the concentric passage opening, and a pinion that protrudes through the top housing part.

16. The fixing module of claim 15, wherein the snap ring includes an actuating lever extending therefrom.

17. A fixing module for fixing a push button or emergency stop button or rotary actuator of a control and signaling device, the fixing module being constructed from a top housing part and a bottom housing part, each of the top housing part and the bottom housing part including:

a cuboidal structure including a top side, an underside and four side parts connecting the top side to the underside;
a snap ring on the top side of the bottom housing part; and
a concentric passage opening in the top side of both the top housing part and the bottom housing part, wherein an electrically conductive component made of metal with a grounding function is in surface contact with the top side of the bottom housing part, wherein the electrically conductive component is sandwiched between the top housing part and the bottom housing part.

18. The fixing module of claim 17, wherein the electrically conductive component is a spring element tensioned between a connection dome and a pinion on the top side of the bottom housing part.

19. A push button or emergency stop button or rotary actuator comprising the fixing module of claim 17.

20. A control and signaling device having a push button or emergency stop button or rotary actuator and at least one switch element, wherein the push button or emergency stop button or rotary actuator and the at least one switch element are mounted on the fixing module of claim 17.

* * * * *